United States Patent
Ryu et al.

(10) Patent No.: US 10,077,721 B2
(45) Date of Patent: Sep. 18, 2018

(54) SYSTEM AND METHOD FOR CONTROLLING VALVE TIMING OF CONTINUOUS VARIABLE VALVE DURATION ENGINE

(71) Applicant: HYUNDAI MOTOR COMPANY, Seoul (KR)

(72) Inventors: In Sang Ryu, Incheon (KR); Kyoung Pyo Ha, Seongnam-si (KR); You Sang Son, Suwon-si (KR); Kiyoung Kwon, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 193 days.

(21) Appl. No.: 15/340,755

(22) Filed: Nov. 1, 2016

(65) Prior Publication Data
US 2017/0268436 A1 Sep. 21, 2017

(30) Foreign Application Priority Data
Mar. 16, 2016 (KR) .......................... 10-2016-0031659

(51) Int. Cl.
*F02D 13/02* (2006.01)
*F02D 41/00* (2006.01)
(Continued)

(52) U.S. Cl.
CPC ..... *F02D 13/0215* (2013.01); *F02D 41/0002* (2013.01); *F01L 13/0015* (2013.01);
(Continued)

(58) Field of Classification Search
CPC ............. F02D 13/0215; F02D 13/0219; F02D 2013/005; F02D 41/0002; F02D 41/2422; F02D 2041/001; F02D 2041/002
See application file for complete search history.

(56) References Cited

U.S. PATENT DOCUMENTS 5,161,497 A * 11/1992 Simko ................. F02D 13/0219
123/90.15
5,622,144 A * 4/1997 Nakamura .......... F01L 1/34406
123/90.15

(Continued)

FOREIGN PATENT DOCUMENTS

| JP | 2006-046293 A | 2/2006 |
| JP | 2006-336659 A | 12/2006 |
| WO | 2013-171830 A1 | 11/2013 |

*Primary Examiner* — Erick Solis
*Assistant Examiner* — Anthony L Bacon
(74) *Attorney, Agent, or Firm* — Brinks Gilson & Lione

(57) ABSTRACT

The present disclosure provides a system and a method for controlling valve timing of a continuous variable valve duration engine. The method includes: classifying control regions based on engine speed and load; retarding intake valve closing (IVC) timing, applying a long duration to an exhaust valve, and limiting a valve overlap in a first control region; advancing the IVC timing, applying the long duration to the exhaust valve, and controlling the valve overlap in a second control region; applying the long duration to the exhaust valve and advancing the IVC timing in a third control region; controlling a throttle valve to be fully opened and applying a short duration to the exhaust valve in a fourth control region; and controlling the throttle valve to be fully opened, applying the long duration to the exhaust valve, and retarding the IVC timing in a fifth control region.

8 Claims, 10 Drawing Sheets

(51) Int. Cl.
    *F02D 41/24*     (2006.01)
    *F01L 13/00*     (2006.01)
    *F01L 1/053*     (2006.01)
    *F01L 1/344*     (2006.01)

(52) U.S. Cl.
    CPC ............ *F01L 2001/0537* (2013.01); *F01L 2001/34496* (2013.01); *F01L 2820/041* (2013.01); *F02D 41/2422* (2013.01); *F02D 2041/001* (2013.01); *F02D 2200/101* (2013.01); *Y02T 10/18* (2013.01); *Y02T 10/42* (2013.01)

(56) References Cited

U.S. PATENT DOCUMENTS

| | | | | |
|---|---|---|---|---|
| 5,713,317 | A * | 2/1998 | Yoshioka | F01L 1/344 123/90.15 |
| 7,121,255 | B2 * | 10/2006 | Liu | F02D 13/0234 123/305 |
| 8,205,587 | B2 * | 6/2012 | Murata | F01L 1/053 123/90.15 |
| 2001/0050067 | A1 * | 12/2001 | Sato | F01L 1/34 123/90.17 |
| 2004/0099244 | A1 * | 5/2004 | Matsuura | F01L 1/022 123/432 |
| 2009/0031973 | A1 * | 2/2009 | Murata | F02D 13/0238 123/90.16 |
| 2013/0152888 | A1 * | 6/2013 | Cho | F02D 13/0203 123/90.15 |

* cited by examiner

SYSTEM AND METHOD FOR CONTROLLING VALVE TIMING OF CONTINUOUS VARIABLE VALVE DURATION ENGINE

CROSS-REFERENCE TO RELATED APPLICATION

This application claims priority to and the benefit of Korean Patent Application No. 10-2016-0031659, on Mar. 16, 2016, the entire contents of which are incorporated herein by reference.

FIELD

The present disclosure relates to a system and a method for controlling valve timing of a continuous variable valve duration engine.

BACKGROUND

The statements in this section merely provide background information related to the present disclosure and may not constitute prior art.

An internal combustion engine combusts mixed gas in which fuel and air are mixed at a predetermined ratio through a set ignition mode to generate power by using explosion pressure.

Generally, a camshaft is driven by a timing belt connected with a crankshaft that converts linear motion of a piston by the explosion pressure into rotating motion to actuate an intake valve and an exhaust valve, and while the intake valve is opened, air is suctioned into a combustion chamber, and while an exhaust valve is opened, gas which is combusted in the combustion chamber is exhausted.

To improve the operations of the intake valve and the exhaust valve and thereby improve engine performance, a valve lift and a valve opening/closing time (timing) are controlled according to a rotational speed or load of an engine. Therefore, a continuous variable valve duration (CVVD) device controlling opening duration of an intake valve and an exhaust valve of the engine and a continuous variable valve timing (CVVT) device controlling opening timing and closing timing of the intake valve and the exhaust valve of the engine have been developed.

The CVVD device adjusts opening duration (opening time) of the valve. In addition, the CVVT device advances or retards opening and closing timing of the valve in a state in which the duration of the valve is fixed. In other words, when the opening timing of the valve is determined, the closing timing is automatically determined according to the duration of the valve.

The above information disclosed in this Background section is only for enhancement of understanding of the background of the disclosure and therefore it may contain information that does not form the prior art that is already known to a person of ordinary skill in the art.

Further areas of applicability will become apparent from the description provided herein. It should be understood that the description and specific examples are intended for purposes of illustration only and are not intended to limit the scope of the present disclosure.

SUMMARY

The present disclosure provides a system and method for controlling valve timing of a continuous variable valve duration engine having advantages of simultaneously controlling duration and timing of the continuous variable valve by mounting a continuous variable valve timing device on an intake and mounting a two-stage variable valve duration device and a continuous variable valve timing device on an exhaust.

A method for controlling valve timing of an engine provided with a continuous variable valve timing (CVVT) device at an intake and a two-stage variable valve duration (VVD) device and a continuous variable valve timing (CVVT) device at an exhaust according to one form of the present disclosure may include: classifying a plurality of control regions depending on an engine speed and an engine load; retarding an intake valve closing (IVC) timing, applying a long duration to an exhaust valve, and limiting a valve overlap between an intake valve and the exhaust valve in a first control region; advancing the IVC timing, applying the long duration to the exhaust valve, and controlling the valve overlap according to the engine load in a second control region; applying the long duration to the exhaust valve and advancing the IVC timing according to an increase of the engine load in a third control region; controlling a throttle valve to be fully opened and applying a short duration to the exhaust valve in a fourth control region; and controlling the throttle valve to be fully opened, applying the long duration to the exhaust valve, and retarding the IVC timing according to an increase of the engine speed in a fifth control region.

Exhaust valve closing (EVC) timing may be set as a maximum value capable of maintaining combustion stability in the first control region.

The valve overlap may be increased by retarding the exhaust valve closing (EVC) timing until the engine load reaches a predetermined load and the valve overlap may be reduced by advancing the EVC timing when the engine load is increased over the predetermined load in the second control region.

Exhaust valve opening (EVO) timing may be controlled to be close to bottom dead center in the fourth control region.

A system for controlling valve timing of a continuous variable valve duration engine according to one form of the present disclosure may include: a data detector detecting data related to a running state of a vehicle; a camshaft position sensor detecting a position of a camshaft; an intake continuous variable valve timing (CVVT) device controlling opening timing and closing timing of an intake valve of the engine; an exhaust two-stage variable valve duration (VVD) device controlling opening duration of an exhaust valve of the engine in two stages; an exhaust continuous variable valve timing (CVVT) device controlling opening timing and closing timing of the exhaust valve; and a controller configured to classify a plurality of control regions depending on an engine speed and an engine load based on signals from the data detector and the camshaft position sensor, and configured to control operations of the intake CVVT device, the exhaust two-stage VVD device and the exhaust CVVD device according to the control regions.

The controller retards the intake valve closing (IVC) timing, applies a long duration to the exhaust valve and limits a valve overlap between the intake valve and the exhaust valve in a first control region, advances the IVC timing, applies the long duration to the exhaust valve and controls the valve overlap according to the engine load in a second control region, applies the long duration to the exhaust valve and advances the IVC timing according to an increase of the engine load in a third control region, controls a throttle valve to be fully opened and applies a short duration to the exhaust valve in a fourth control region, and controls the throttle valve to be fully opened, applies the long duration to the exhaust valve and retards the IVC timing according to an increase of the engine speed in a fifth control region.

The controller may set the exhaust valve closing (EVC) timing as a maximum value capable of maintaining combustion stability in the first control region.

The controller may increase the valve overlap by retarding exhaust valve closing (EVC) timing until the engine load reaches a predetermined load and may reduce the valve overlap by advancing the EVC timing when the engine load is increased over the predetermined load in the second control region.

The controller may control the exhaust valve opening (EVO) timing to be close to bottom dead center in the fourth control region.

According to one form of the present disclosure, duration and timing of the continuous variable valve are simultaneously controlled, so the engine may be controlled under desirable conditions.

That is, since the opening timing and closing timing of the intake valve and the exhaust valve are appropriately controlled, the fuel efficiency under a partial load condition and power performance under a high load condition are improved. In addition, a fuel amount for starting may be reduced by increasing a valid compression ratio, and exhaust gas may be reduced by shortening time for heating a catalyst.

Further, since the two-stage variable valve duration device is used instead of a continuous variable valve duration device at the exhaust, production cost reduced while maintaining power performance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
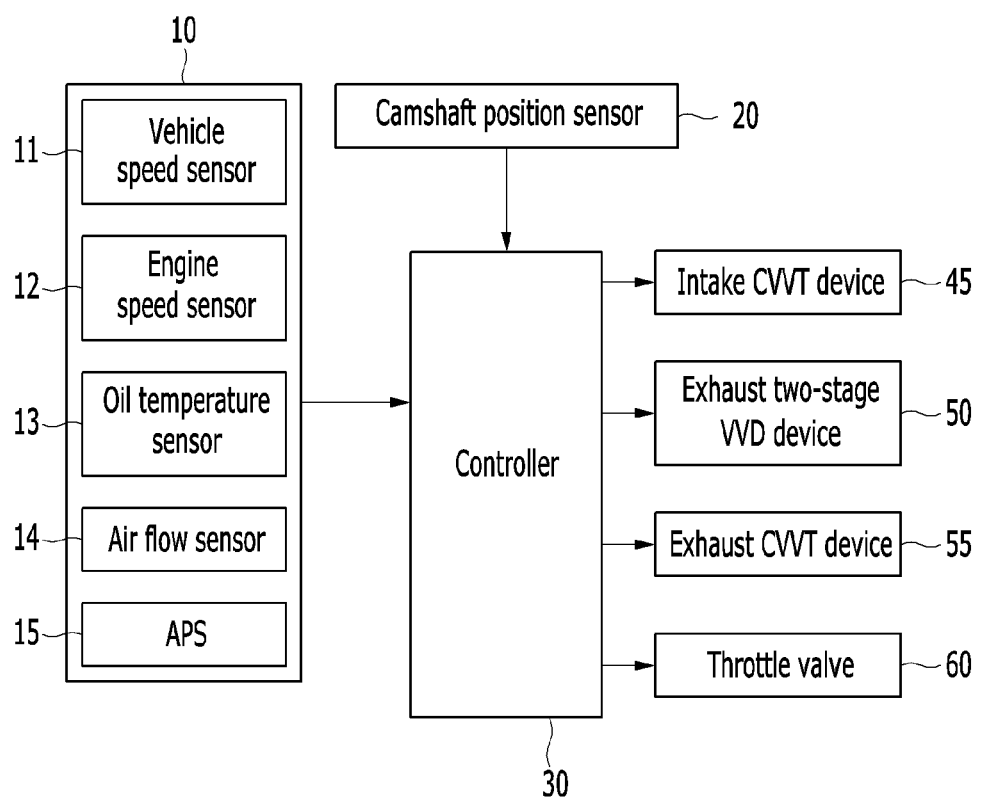
FIG. 1 is a schematic block diagram showing a system for controlling valve timing of a continuous variable valve duration engine according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

Throughout this specification and the claims which follow, unless explicitly described to the contrary, the word "comprise" and variations such as "comprises" or "comprising" will be understood to imply the inclusion of stated elements but not the exclusion of any other elements.

It is understood that the terms "vehicle" or "vehicular" or other similar terms as used herein are inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example a gasoline-powered and electric-powered vehicle.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

FIG. 1 is a schematic block diagram showing a system for controlling valve timing of a continuous variable valve duration engine according to an exemplary form of the present disclosure.

As shown in FIG. 1, a system for controlling valve timing of a continuous variable valve duration engine includes a data detector 10, a camshaft position sensor 20, a controller 30, an intake continuous variable valve timing device 45, an exhaust two-stage variable valve duration device 50, an exhaust continuous variable valve timing device 55, and a throttle valve 60, although other sensors or systems may be employed to detect or determine the desired data.

The data detector 10 detects data related to a running state of the vehicle for controlling the CVVD device and the CVVT devices, and includes a vehicle speed sensor 11, an engine speed sensor 12, an oil temperature sensor 13, an air flow sensor 14, and an accelerator pedal position sensor (APS) 15.

The vehicle speed sensor 11 detects a vehicle speed, and transmits a signal corresponding thereto to the controller 30. The vehicle speed sensor 11 may be mounted at a wheel of the vehicle.

The engine speed sensor 12 detects an engine speed from a change in phase of a crankshaft or camshaft, and transmits a signal corresponding thereto to the controller 30.

The oil temperature sensor (OTS) 13 detects temperature of oil flowing through an oil control valve (OCV), and transmits a signal corresponding thereto to the controller 30.

The oil temperature detected by the oil temperature sensor 13 may be determined by determining a coolant temperature using a coolant temperature sensor mounted at a coolant passage of an intake manifold. Therefore, in one form, the oil temperature sensor 13 may include the coolant temperature sensor, and the oil temperature should be understood to be the coolant temperature.

The air flow sensor 14 detects an air amount flowing into the intake manifold, and transmits a signal corresponding thereto to the controller 30.

The accelerator pedal position sensor 15 detects a degree at which a driver pushes an accelerator pedal, and transmits a signal corresponding thereto to the controller 30. The position value of the accelerator pedal is 100% when the accelerator pedal is pressed fully, and the position value of the accelerator pedal is 0% when the accelerator pedal is not pressed at all.

The throttle valve position sensor that is mounted on an intake passage may be used instead of the accelerator pedal position sensor 15. Therefore, in one form, the accelerator pedal position sensor 15 may include the throttle valve position sensor, and the position value of the accelerator pedal should be understood to be an opening value of the throttle value.

The camshaft position sensor 20 detects a position of a camshaft angle, and transmits a signal corresponding thereto to the controller 30.

Figure 2:
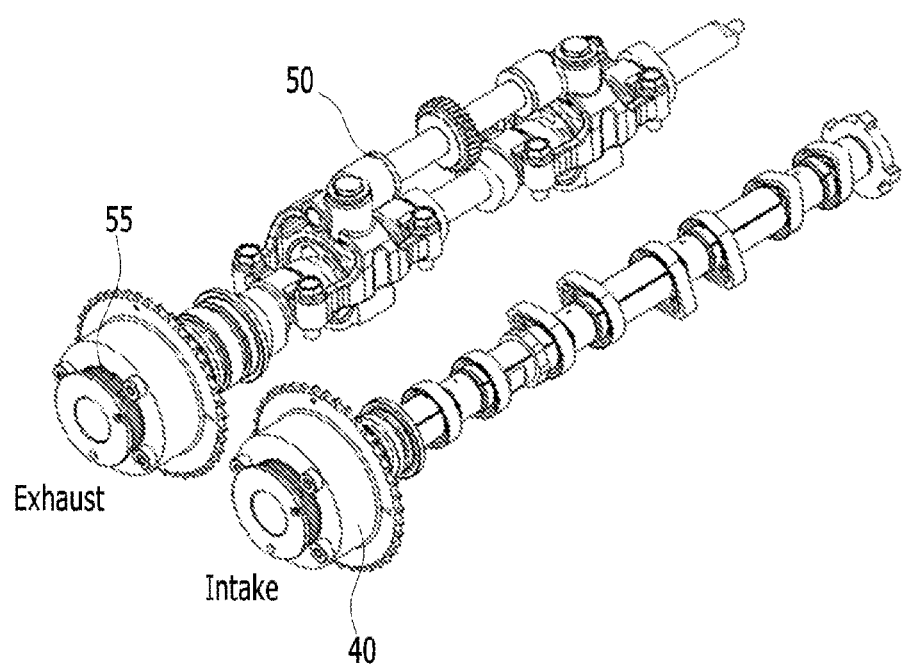
FIG. 2 is a perspective view showing an intake provided with a continuous variable valve timing device and an exhaust provided with a two-stage variable valve duration device and a continuous variable valve timing device according to one form of the present disclosure.

FIG. 2 is a perspective view showing an intake provided with a continuous variable valve timing device and an exhaust provided with a two-stage variable valve duration device and a continuous variable valve timing device according to one form of the present disclosure.

As shown in FIG. 2, the continuous variable valve timing device is mounted on the intake, and the two-stage variable valve duration device and the continuous variable valve timing device are mounted on the exhaust. Therefore, the intake valve duration (IVD) is fixed. If the IVD becomes long, fuel efficiency and high speed performance of the vehicle may be improved, but low speed performance may be deteriorated. Thus, the IVD may be fixed at an angle of approximately 250 to 260 degrees.

The intake continuous variable valve timing (CVVT) device 45 controls an opening timing and a closing timing of an intake valve of the engine according to a signal from the controller 30, and the exhaust continuous variable valve timing (CVVT) device 55 controls an opening timing and a closing timing of an exhaust valve of the engine according to a signal from the controller 30.

The exhaust two-stage variable valve duration (VVD) device 50 controls an opening duration of the exhaust valve of the engine in two stages according to a signal from the controller 30. Since a two-stage VVD device 50 operated by a solenoid valve is used instead of a CVVD device, a motor and a sensor for operating the CVVD device can be omitted, thereby reducing production cost.

If exhaust valve duration (EVD) is becomes long, fuel efficiency and high speed performance of the vehicle may be improved, but low speed performance may be deteriorated. Thus, a short duration for low speed performance and a long duration for high speed performance may be set. For example, the short duration may be set at an angle of approximately 180 to 210 degrees, and the long duration may be set at an angle of approximately 240 to 250 degrees.

The exhaust two-stage VVD device 50 may apply the short duration and the long duration to the exhaust valve by switching.

The throttle valve 60 adjusts air amount flowing into the intake manifold.

The controller 30 classifies a plurality of control regions depending on an engine speed and an engine load based on signals of the data detector 10 and the camshaft position sensor 20, and controls operations of the intake CVVT device 45, the exhaust two stage VVD device 50, the exhaust CVVT device, and the throttle valve 60 according to the control regions. Herein, the plurality of control regions may be classified into five regions.

The controller 30 retards an intake valve closing (IVC) timing, applies the long duration to the exhaust valve and limits a valve overlap in a first control region, advances the IVC timing, applies the long duration to the exhaust valve and controls the valve overlap according to the engine load in a second control region, applies the long duration to the exhaust valve and advances the IVC timing according to an increase of the engine load in a third control region, controls the throttle valve to be fully opened and applies the short duration to the exhaust valve in a fourth control region, and controls the throttle valve to be fully opened, applies the long duration to the exhaust valve and retards the IVC timing according to an increase of the engine speed in a fifth control region.

For these purposes, the controller 30 may be implemented with at least one processor executed by a predetermined program, and the predetermined program may programmed in order to perform each step of a method for controlling valve timing of a continuous variable valve duration engine.

Various forms described herein may be implemented within a recording medium that may be read by a computer or a similar device by using software, hardware, or a combination thereof.

For example, the hardware of the forms described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units designed to perform any other functions.

The software such as procedures and functions described in the present disclosure may be implemented by separate software modules. Each of the software modules may perform one or more functions and operations described in the present disclosure. A software code may be implemented by a software application written in an appropriate program language.

Hereinafter, a method for controlling valve timing of a continuous variable valve duration engine according to one form of the present disclosure will be described in detail with reference to FIG. 3A to FIG. 5C.

Figure 3A:
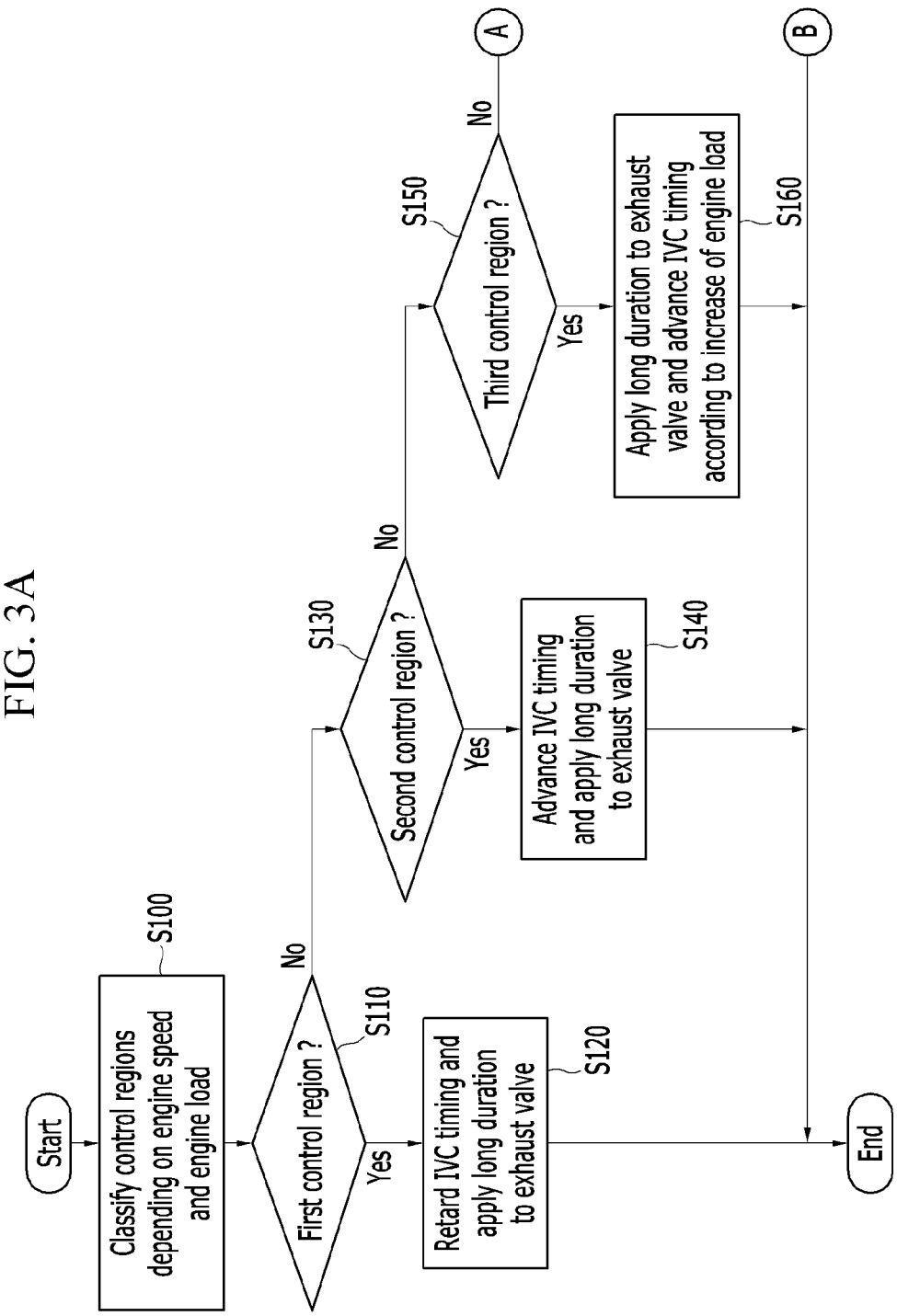
FIG. 3A and FIG. 3B are flowcharts showing a method for controlling valve timing of a continuous variable valve duration engine according to one form of the present disclosure.
Figure 3B:
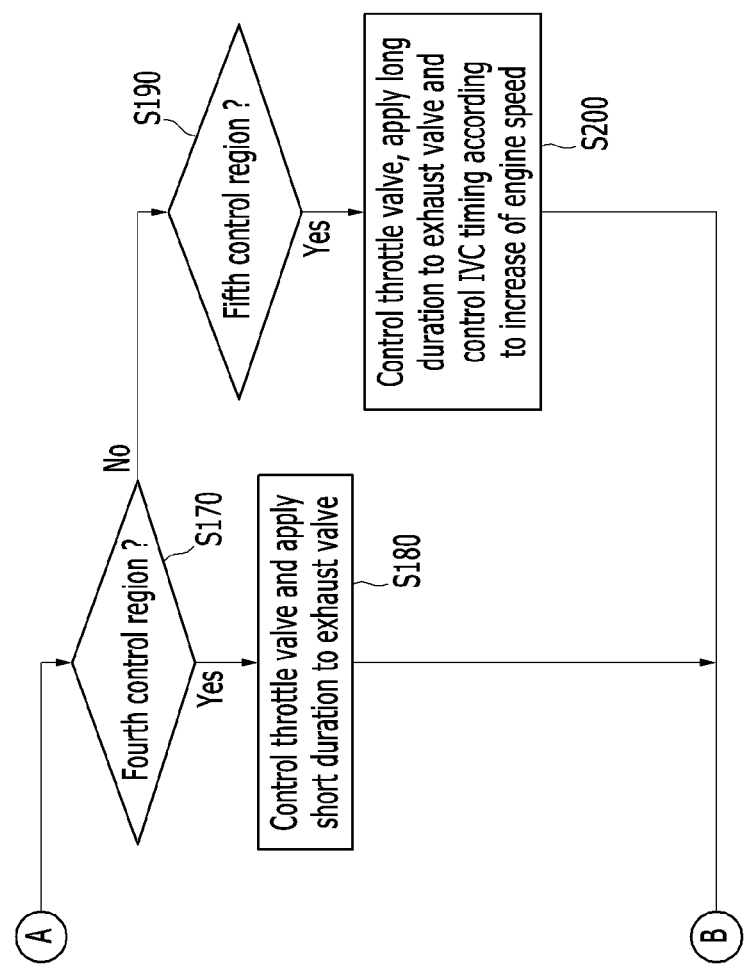
Figure 4A:
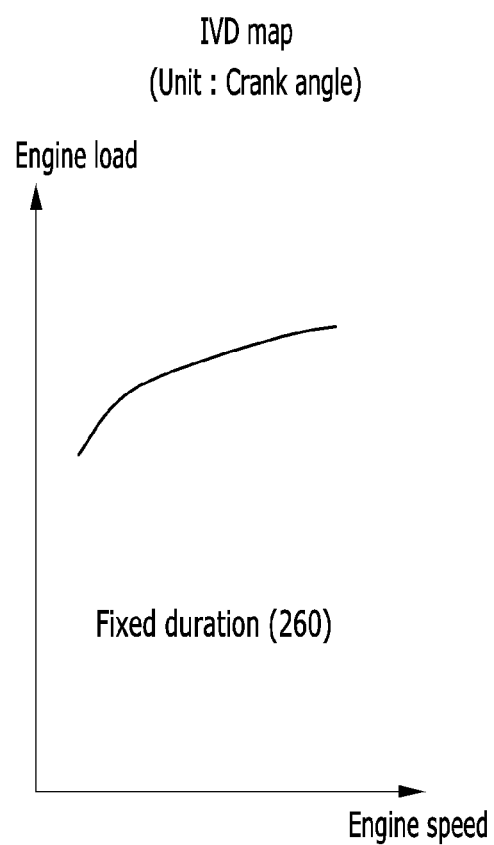
FIGS. 4A-4C are graphs showing duration, opening timing, and closing timing of an intake valve depending on an engine load and an engine speed according to the present disclosure.
Figure 4B:
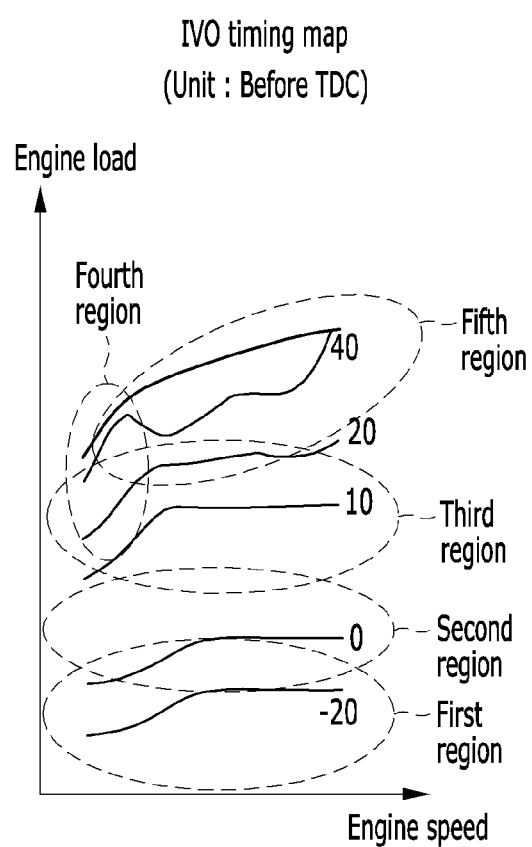
Figure 4C:
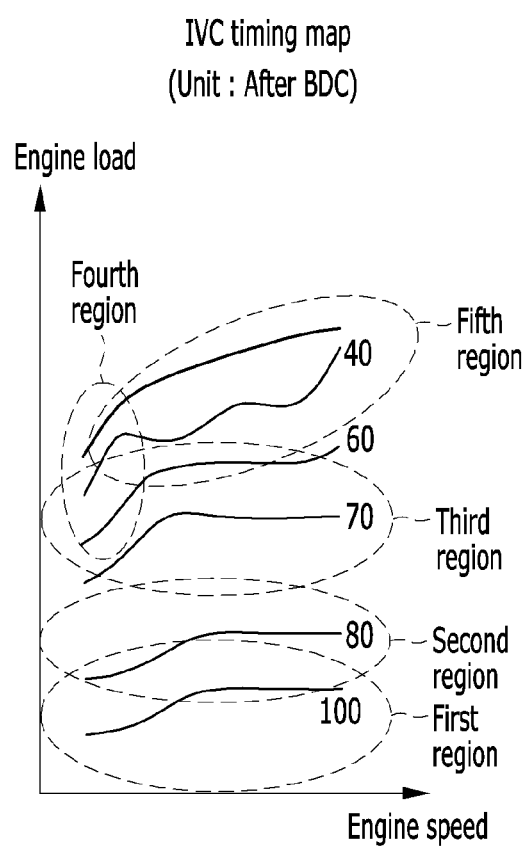
Figure 5A:
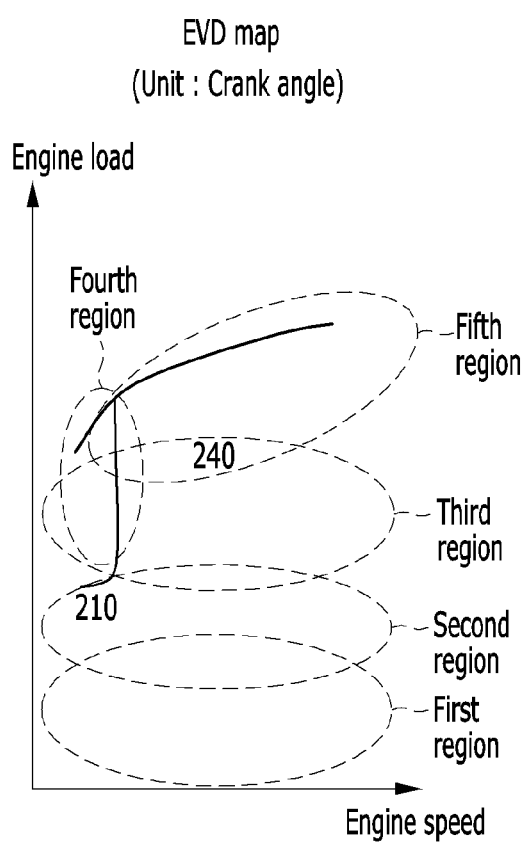
FIGS. 5A-5C are graphs showing duration, opening timing, and closing timing of an exhaust valve depending on an engine load and an engine speed according to the present disclosure.
Figure 5B:
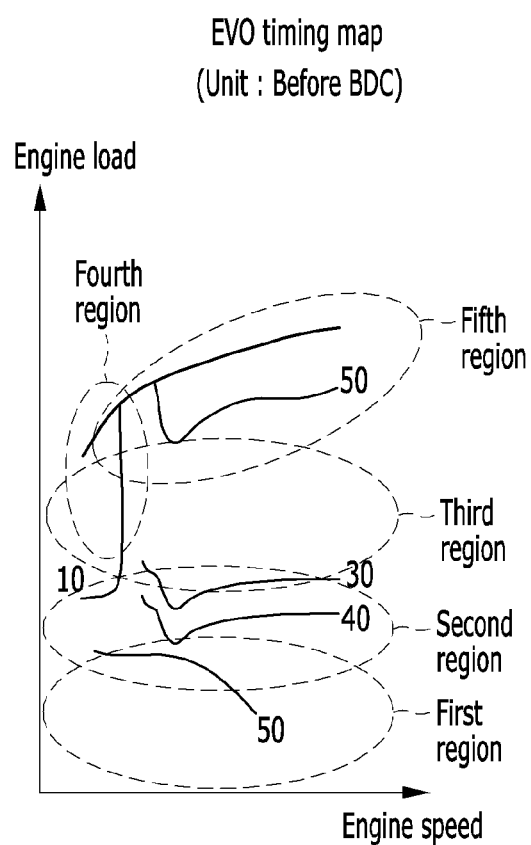
Figure 5C:
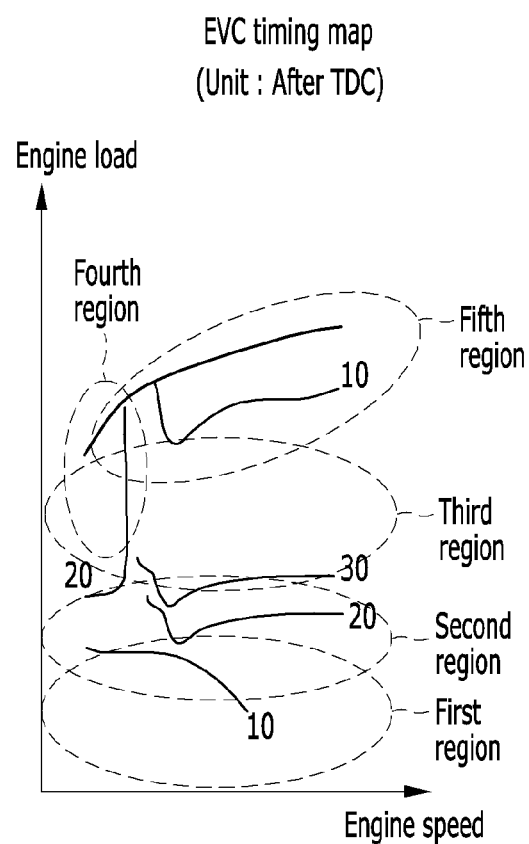

FIGS. 3A and 3B are flowcharts showing a method for controlling valve timing of a continuous variable valve duration engine. In addition, FIGS. 4A-4C are graphs showing duration, opening timing, and closing timing of an intake valve depending on an engine load and an engine speed, and FIGS. 5A-5C are graphs showing duration, opening timing, and closing timing of an exhaust valve depending on an engine load and an engine speed.

As shown in FIGS. 3A and 3B, a method for controlling valve timing of a continuous variable valve duration engine begins with classifying a plurality of control regions depending on an engine load and an engine speed at step S100. The first to fifth control regions are indicated in FIG. 4A to FIG. 5C.

The controller 30 may classify control regions as the first control region when the engine load is less than a first predetermined load, the second control region when the engine load is equal to or greater than the first predetermined load and less than a second predetermined load, and the third control region when the engine load is equal to or greater than the second predetermined load and less than a third predetermined load. In addition, the controller 30 may classify control regions as the fourth control region when the engine load is equal to or greater than the second predetermined load and the engine speed is less than a predetermined speed, and the fifth control region when the engine load is equal to or greater than the third predetermined load and the engine speed is equal to or greater than the predetermined speed.

Meanwhile, as shown in FIG. 4A to FIG. 5C, a crank angle is indicated in an intake valve duration (IVD) map and an exhaust valve duration (EVD) map. In addition, a number designated in an intake valve opening (IVO) timing map represents before top dead center (TDC), a number designated an intake valve closing (IVC) timing map represents after bottom dead center (BDC), a number designated in an exhaust valve opening (EVO) timing map represents before BDC, and a number designated in an exhaust valve closing (EVC) timing map represents after TDC. Regions and curved lines shown in FIG. 4A to FIG. 5C are just examples for describing one form of the present disclosure, and the present disclosure is not limited thereto.

When the control regions are classified depending on the engine load and the engine speed at step S100, the controller 30 determines whether a current engine state belongs to the first control region at step S110.

When the engine load is less than the first predetermined load at step S110, the controller 30 determines that the current engine state belongs to the first control region. In this case, the controller 30 retards the IVC timing, applies the long duration to the exhaust valve, and controls the valve overlap between the intake valve and the exhaust valve at step S120. The valve overlap represents a state in which the intake valve is opened and the exhaust valve is not yet closed.

When the engine is operated at a low load condition, fuel efficiency may be improved by maximally retarding the IVC timing. Accordingly, the controller 30 retards the IVC timing to an angle of approximately 100 degrees after bottom dead center (i.e., a late intake valve close (LIVC) position).

In addition, the controller 30 may apply the long duration to the exhaust valve and may set the EVC timing as a maximum value capable of maintaining combustion stability such that the valve overlap is limited. In this case, since the long duration is applied to the exhaust valve, the controller 30 controls an exhaust valve opening (EVO) timing to an angle of approximately 50 degrees before bottom dead center (BDC).

When the current engine state does not belong to the first control region at step S110, the controller 30 determines whether the current engine state belongs to the second control region at step S130.

When the engine load is equal to or greater than the first predetermined load and less than the second predetermined load at step S130, the controller 30 determines that the current engine state belongs to the second control region. In this case, the controller 30 advances the IVC timing, applies the long duration to the exhaust valve, and controls the valve overlap according to the engine load at step S140.

When the IVC timing is the LIVC position in the first control region, the valve overlap is limited. The controller 30 may generate the valve overlap by advancing the IVC timing in the second control region.

The controller 30 may increase the valve overlap by retarding the EVC timing in an after TDC direction until the engine load reaches a predetermined load.

When the EVC timing is retarded in the after TDC direction, as the valve overlap is increased, intake pumping may be decreased, however, since the EVO timing is close to BDC according to the long duration, exhaust pumping may be increased. Accordingly, when the engine load is increased over the predetermined load, the controller 30 may reduce the valve overlap by advancing the EVC timing toward a locking position.

When the current engine state does not belong to the second control region at step S130, the controller 30 determines whether the current engine state belongs to the third control region at step S150.

When the engine load is equal to or greater than the second predetermined load and less than the third predetermined load, the controller 30 determines that the current engine state belongs to the third control region. In this case, the controller 30 applies the long duration to the exhaust valve and advances the IVC timing according to the increase of the engine load at step S160.

Since the valve overlap is increased as the IVC timing is advanced, the controller 30 may reduce the valve overlap by fixing the EVC timing at the locking position.

The long duration is applied to the exhaust valve in the second and third control regions. The exhaust pumping needs to be decreased and the valve overlap needs to be increased in the second control region, but the valve overlap needs to be decreased in the third control region.

When the current engine state does not belong to the third control region at step S150, the controller 30 determines whether the current engine state belongs to the fourth control region at step S170.

The controller 30 determines that the current engine state belongs to the fourth control region when the engine load is equal to or greater than the second predetermined load and the engine speed is less than the predetermined speed. In this case, the controller 30 controls the throttle valve to be fully opened and applies the short duration to the exhaust valve at step S180.

Since the engine speed is less than the predetermined speed (e.g., approximately 1500 rpm) in the fourth control region, a scavenging phenomenon in which combustion gas is emitted due to reduction of exhaust port pressure is generated by using exhaust interference reduction.

The EVC timing is controlled after TDC to generate the scavenging phenomenon, and effect of the scavenging phenomenon may be maximized when exhaust interference is reduced by controlling the EVO timing to be close to BDC. For this purpose, the controller 30 may apply the short duration to the exhaust valve instead of the long duration. With reference to switching line shown in FIGS. 5A-5C, a left side of the switching line is a region to which the short duration is applied, and a right side of the switching line is a region to which the long duration is applied.

When the current engine state does not belong to the fourth control region at step S170, the controller 30 determines whether the current engine state belongs to the fifth control region at step S190.

When the engine load is equal to or greater than the third predetermined load and the engine speed is equal to or greater than the predetermined speed at step S190, the controller 30 determines that the current engine state belongs to the fifth control region. In this case, the controller 30 controls the throttle valve to be fully opened, applies the long duration to the exhaust valve, and retards the IVC timing according to the increase of the engine speed at step S200.

Since the engine speed is equal to or greater than the predetermined speed (e.g., approximately 1500 rpm) in the fifth control region, the scavenging phenomenon disappears or is reduced, and thus the long duration of the exhaust valve increases exhaust pumping. The controller 30 may apply the long duration to the exhaust valve by switching the short duration applied in the fourth control region, and retards the IVC timing according to the increase of the engine speed.

The IVC timing may be gradually retarded from an angle of approximately 20 degrees to an angle of approximately 60 degrees after BDC according to the increase of the engine speed.

As described above, according to one form of the present disclosure, duration and timing of the continuous variable valve are simultaneously controlled, so the engine may be controlled under desirable conditions.

That is, since the opening timing and closing timing of the intake valve and the exhaust valve are appropriately controlled, the fuel efficiency under a partial load condition and power performance under a high load condition are improved. In addition, a fuel amount for starting may be reduced by increasing a valid compression ratio, and exhaust gas may be reduced by shortening time for heating a catalyst.

Further, since the two-stage variable valve duration device is used instead of a continuous variable valve duration device at the exhaust, production cost reduced while maintaining power performance.

While this disclosure has been described in connection with what is presently considered to be practical forms, it is to be understood that the disclosure is not limited to the disclosed forms, but, on the contrary, is intended to cover various modifications and equivalent arrangements included within the spirit and scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for controlling valve timing of an engine provided with a continuous variable valve timing (CVVT) device at an intake and a two-stage variable valve duration (VVD) device and a continuous variable valve timing (CVVT) device at an exhaust, the method comprising:
   classifying, by a controller, a plurality of control regions depending on an engine speed and an engine load;
   retarding, by the controller, an intake valve closing (IVC) timing, applying a long duration to an exhaust valve, and limiting a valve overlap between an intake valve and the exhaust valve in a first control region;
   advancing, by the controller, the IVC timing, applying the long duration to the exhaust valve, and controlling the valve overlap according to the engine load in a second control region;
   applying, by the controller, the long duration to the exhaust valve and advancing the IVC timing according to an increase of the engine load in a third control region;
   controlling, by the controller, a throttle valve to be fully opened and applying a short duration to the exhaust valve in a fourth control region; and
   controlling, by the controller, the throttle valve to be fully opened, applying the long duration to the exhaust valve, and retarding the IVC timing according to an increase of the engine speed.

2. The method of claim 1, wherein an exhaust valve closing (EVC) timing is set as a maximum value capable of maintaining combustion stability in the first control region.

3. The method of claim 1, wherein the valve overlap is increased by retarding an exhaust valve closing (EVC) timing until the engine load reaches a predetermined load and the valve overlap is reduced by advancing the EVC timing when the engine load is increased over the predetermined load in the second control region.

4. The method of claim 1, wherein an exhaust valve opening (EVO) timing is controlled to be close to a bottom dead center in the fourth control region.

5. A system for controlling valve timing of a continuous variable valve duration engine, the system comprising:
   a data detector configured to detect data related a running state of a vehicle;
   a camshaft position sensor configured to detect a position of a camshaft;
   an intake continuous variable valve timing (CVVT) device configured to control an opening timing and a closing timing of an intake valve of the engine;
   an exhaust two-stage variable valve duration (VVD) device configured to control an opening duration of an exhaust valve of the engine in two stages;
   an exhaust continuous variable valve timing (CVVT) device configured to control an opening timing and a closing timing of the exhaust valve; and
   a controller configured to classify a plurality of control regions depending on an engine speed and an engine load based on signals from the data detector and the camshaft position sensor, and configured to control operations of the intake CVVT device, the exhaust two-stage VVD device and the exhaust CVVD device according to the control regions;
   wherein the controller retards an intake valve closing (IVC) timing, applies a long duration to the exhaust valve and limits a valve overlap between the intake valve and the exhaust valve in a first control region, advances the IVC timing, applies the long duration to the exhaust valve and controls the valve overlap according to the engine load in a second control region, applies the long duration to the exhaust valve and advances the IVC timing according to an increase of the engine load in a third control region, controls a throttle valve to be fully opened and applies a short duration to the exhaust valve in a fourth control region, and controls the throttle valve to be fully opened, applies the long duration to the exhaust valve and retards the IVC timing according to an increase of the engine speed in a fifth control region.

6. The system of claim 5, wherein the controller sets an exhaust valve closing (EVC) timing as a maximum value capable of maintaining combustion stability in the first control region.

7. The system of claim 5, wherein the controller increases the valve overlap by retarding an exhaust valve closing (EVC) timing until the engine load reaches a predetermined load and reduces the valve overlap by advancing the EVC timing when the engine load is increased over the predetermined load in the second control region.

8. The system of claim 5, wherein the controller controls an exhaust valve opening (EVO) timing to be close to a bottom dead center in the fourth control region.

* * * * *